United States Patent [19]

Swanson

[11] Patent Number: 4,809,575
[45] Date of Patent: Mar. 7, 1989

[54] MULTI-PURPOSE CONVEYOR SYSTEM
[75] Inventor: Peter E. Swanson, Duluth, Minn.
[73] Assignee: The Pillsbury Co. - 3764, Minneapolis, Minn.
[21] Appl. No.: 936,271
[22] Filed: Dec. 1, 1986
[51] Int. Cl.$^4$ .............................................. B26D 7/06
[52] U.S. Cl. ........................................ 83/152; 83/155; 83/404; 83/404.2; 83/513; 53/55; 53/69; 53/251; 53/516; 53/389; 198/689.1; 198/431
[58] Field of Search ............ 198/431, 424, 689, 465.3, 198/369; 83/155, 152, 155.1, 100, 262, 404, 513, 514, 515–517, 404.1–404.4; 53/55, 69, 251, 250, 249, 513, 516, 517, 389

[56] References Cited

U.S. PATENT DOCUMENTS

| | | | |
|---|---|---|---|
| 2,377,294 | 5/1945 | Belada et al. | 198/431 |
| 2,540,945 | 2/1951 | Hart | 198/431 |
| 2,573,100 | 10/1951 | Haecks | 53/250 |
| 2,655,777 | 10/1953 | Hagen | 53/55 |
| 3,225,513 | 12/1965 | Ehe | 198/431 |
| 3,355,166 | 11/1967 | Plumb | 53/389 |
| 3,385,026 | 5/1968 | Sckërmund | 53/389 |
| 3,739,900 | 6/1973 | Gugler | 53/516 |
| 3,759,126 | 9/1973 | Burgess | 83/157 |
| 4,151,699 | 5/1979 | Focke et al. | 53/389 |
| 4,166,525 | 9/1979 | Bruno | 198/369 |
| 4,304,508 | 12/1981 | Wolf | 198/689.1 |
| 4,527,346 | 7/1985 | Schwartzott | 83/100 |
| 4,662,152 | 5/1987 | Simelunas et al. | 53/251 |

Primary Examiner—Donald R. Schran
Assistant Examiner—Scott A. Smith

[57] ABSTRACT

A Multi-Purpose Conveyor System particularly designed for efficiently handling different types of dough products which conveyor system includes a plurality of coordinated and synchronized conveyor mechanisms, constructed and arranged to eliminate the necessity for manual handling of the dough during the cutting of the dough onto individual pieces, and assembling the desired number of pieces into a product carrier and delivering the product carrier to a transport conveyor system for final processing. This is accomplished by the use of a first conveyor feeding continuous strips of dough, a cutter mechanism for cutting the dough either in the same flat orientation or rotation through a 90 degree reorientation and then depositing the cut dough pieces into product carrier held in a predetermined position on a moving vacuum conveyor belt in order to accurately position the carriers on the belt to permit automatic delivery of the cut dough pieces to the carriers and then subsequently deliver the carriers with the desired number of dough pieces thereon to a transport conveyor for transfer to final processing equipment.

1 Claim, 4 Drawing Sheets

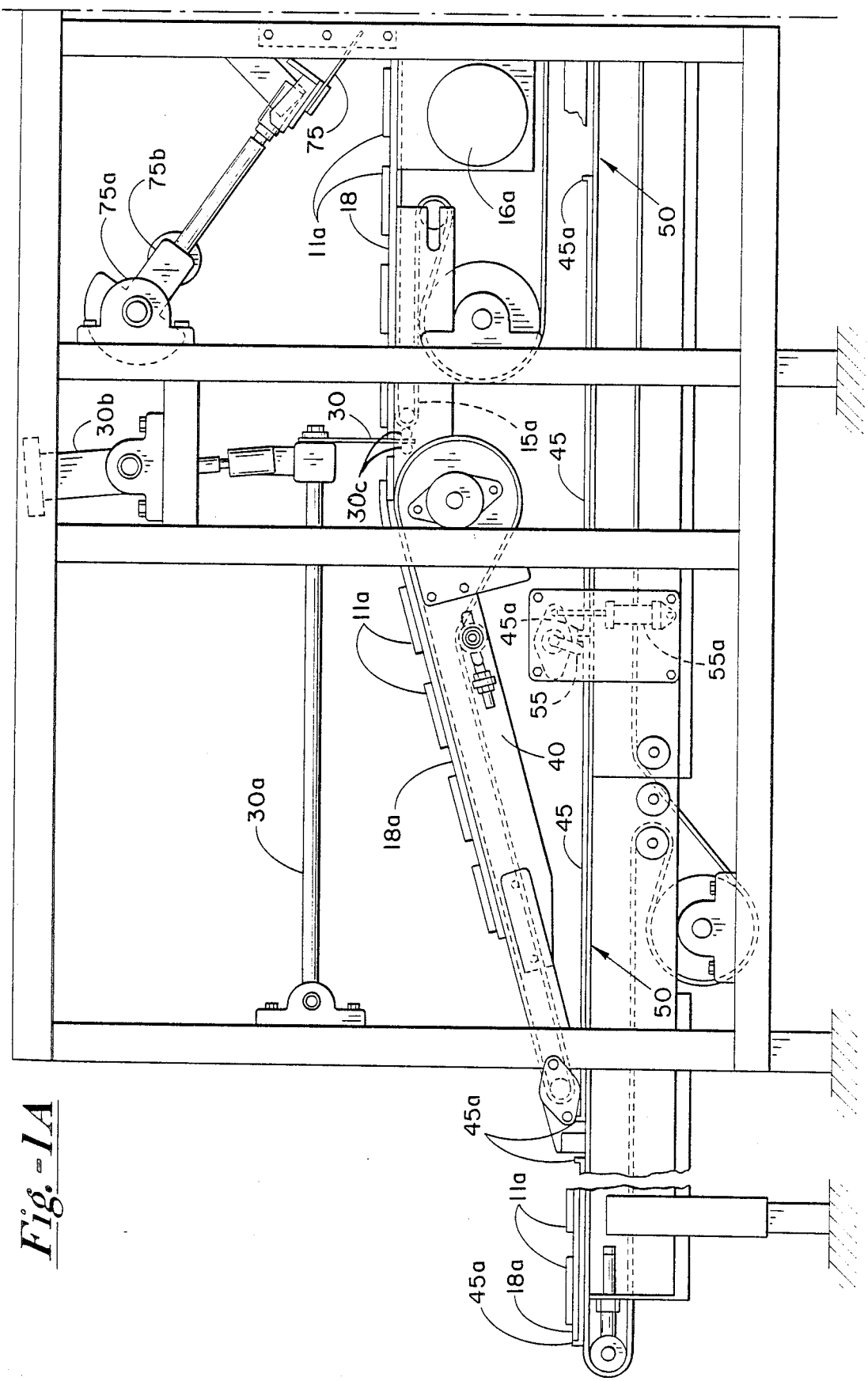

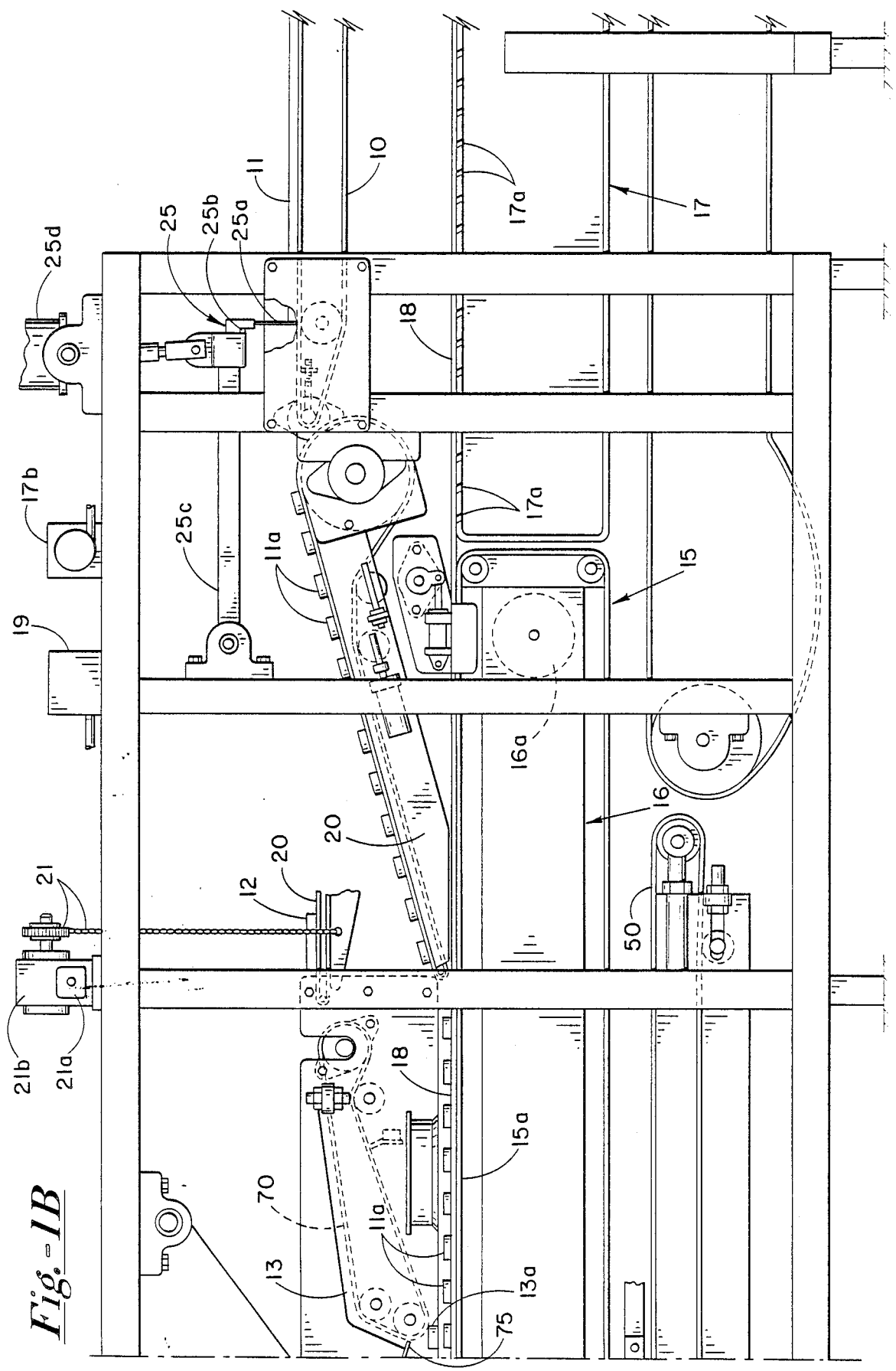

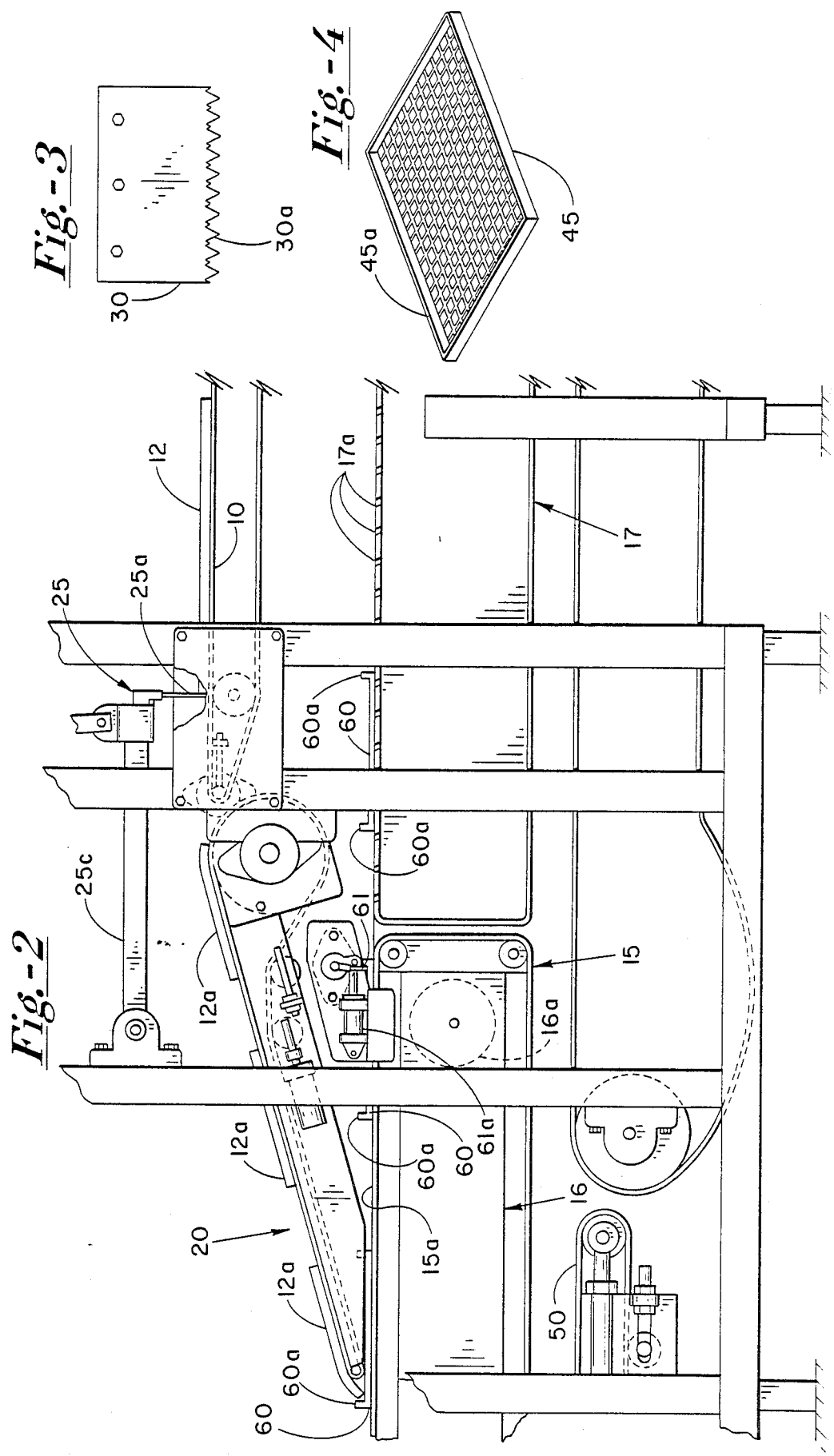

MULTI-PURPOSE CONVEYOR SYSTEM

SUMMARY OF THE INVENTION

In the past, it has frequently been necessary to provide a separate conveyor system for each different type of dough product. In addition to this it has been difficult to synchronize the flow of the cut pieces of dough from one conveyor to another, and also, to deliver the cut pieces of dough in the desired quantities onto product carrier which is then delivered to a transport conveyor system for final processing, requiring manual placing of the dough pieces onto the tray or liner sheet product carrier.

A multi-purpose conveyor system is provided for efficiently handling different types of products such as a variety of different dough products. The system includes a plurality of coordinated conveyors located at different elevations with portions located one above the other for programmed delivery from the upper conveyors to the lower conveyors. A first conveyor mechanism is designed for carrying a continuous ribbon of dough product produced by equipment disposed upstream of the first conveyor. Means are provided for cutting the continuous ribbon into individual product pieces or portions. A second conveyor mechanism is disposed downstream of the first conveyor. This second conveyor is a vacuum bed conveyor and holds a product carrier in position to receive and carry the pieces cut off from the continuous ribbon. The vacuum bed conveyor delivers the filled product carrier to a transport frame and conveyor which then transports the carrier and dough pieces to proofing and baking equipment downstream of the vacuum conveyor. An adjustable extension ramp is provided at the end of the first conveyor and provides a controlled alternate path for for the product being carried by the first conveyor.

In one applied use of the invention, the extension conveyor ramp is located in its down position and delivers cut product pieces onto a product carrier in the form of a continuous liner strip being carried by the second (vacuum) conveyor and traveling under the first conveyor and under the extension conveyor ramp. The second conveyor includes a vacuum bed with a perforated belt traveling thereon to permit a vacuum to be applied to the bottom surface of the imperforate liner strip to hold the liner in a positive controlled position on the second conveyor. After the cut product portions are received on the liner, the liner is cut into the desired lengths with the desired number of cut pieces of product positioned thereon. The individual liner sections with the product thereon are then successively delivered by the vacuum conveyor to transport pans or frames which are being carried by another conveyor mechanism in downstream underlying relation to the second conveyor. Means for synchronizing the delivery of the transport frames are provided in order to receive the respective cut sections of the liner strip in the appropriate registered position within the pan.

An alternative form of cut product carrier is provided by individual aluminum foil trays which are fed from a positive pressure air flow conveyor onto the vacuum conveyor bed where they are held by the vacuum in the desired position to permit registration with the product portions being cut and delivered from the first conveyor. Each tray will then receive the desired number of cut product portions prior to delivery of the loaded foil units to the transport pans which are being carried by the pan conveyor disposed below and downstream of the second conveyor.

The previous product delivery system is designed to cut a continuous strip of product into individual product pieces without reorienting the cut pieces. In other words the cut pieces remain basically flat on the second conveyor bed in the same general orientation as the continuous product strip, before cutting. As an alternative to this flat delivery system a separate reorientation cutter and conveyor section is provided and is particularly adapted for use with a thicker type of dough. The adjustable extension ramp is raised and delivers the thicker dough ribbon to a conveyor section which includes downwardly oriented discharge end. As the product falls off the end of the reorienting conveyor section, in a downward orientation, a cutter cuts the same as it approaches vertical orientation so that each cut piece is delivered on its cut side onto the underlying liner or into aluminum foil trays. In other words as the product is cut it is rotated through 90 degrees from its original horizontal orientation on the upper conveyor section.

The multi-purpose conveyor system disclosed herein is designed to provide a versatile, readily convertible system which can be used for a number of different dough products such as basically flat strips of dough which are cut and delivered "flat" or thicker "rope" sections such as cinnamon roll products and the like and which are reoriented and are delivered onto their sides by the reorienting cutter for subsequent packaging.

DESCRIPTION OF THE DRAWINGS

FIG. 1a is a side elevational view of a portion of the conveyor system embodying the invention;

FIG. 1b is a side elevational view of an adjacent portion of the conveyor system (FIGS. 1a and 1b together forming a full length view of a conveyor system embodying this invention).

FIG. 2 is a side elevational view of an alternative form of product carrier for the cut dough pieces;

FIG. 3 is an elevational view of the blade used to cut the continuous paper liner, FIG. 4 is a perspective view of the transport pan or frame unit.

DESCRIPTION OF THE PREFERRED EMBODIMENT

Figure 5:
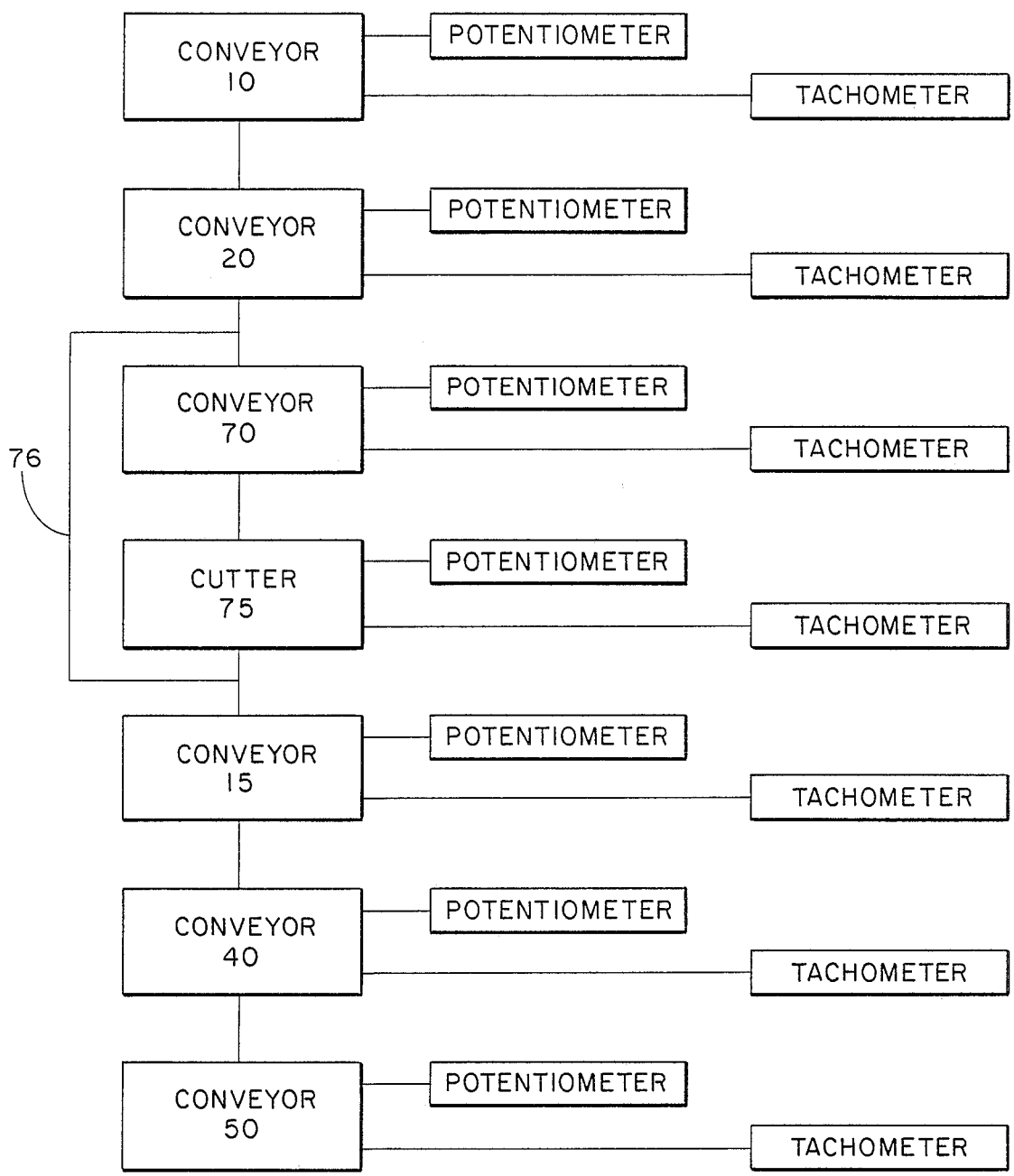
FIG. 5 is a block diagram of a typical conveyor control system.

The conveyor system embodying this invention and disclosed in the drawings includes, in the form illustrated, a first conveyor means for delivering continuous strips of dough product material. This first conveyor means is designated as an entirety by the numeral 10. A second conveyor means 15 underlies the first conveyor 10 and is specifically designed to carry a cut product carrier which receives product pieces cut from the strip of dough material being conveyed by the first conveyor 10. This second conveyor 15 constitutes a vacuum conveyor and is provided with a perforated conveyor belt designated 15a which rides on a vacuum bed or chamber 16. Vacuum hoses (not shown) from a suitable vacuum source 19 are connected at the respective ports 16a of chamber 16. A positive air flow 17 conveyor is located upstream of the vacuum conveyor 15 and has forwardly directed jets 17a to direct the flow of air from a blower 17b longitudinally toward the vacuum conveyor 15. A cut product carrier in the form of a continuous parchment liner strip 18 is illustrated in FIGS. 1a and 1b and is pulled from a continuous supply roll (not shown) and its speed is the same as the perforated vacuum conveyor belt 15a which provides sufficient suction grip to draw the parchment liner 18 from the supply roll. The vacuum securely holds the liner strip 18 against slippage on the top surface of the vacuum belt 15a.

An adjustable extension product conveyor ramp 20 is provided at the end of the product conveyor 10 to receive the dough product from the conveyor 10. The complete ramp unit 20 is shown in a downward inclined position and only the discharge end portion of the ramp 20 is shown in elevated raised position in FIG. 1b. A chain and sprocket drive 21 is provided to raise and lower the ramp 20 and is actuated by a hand knob 21a through a gear box 21b as best shown in FIG. 1b. When the ramp 20 is in its downwardly inclined position a cutter 25 is periodically actuated to cut the ribbon of dough 11 into individual pieces 11a of the desired length. The cutter 25 is designed to cut the dough ribbon "on the fly" and is provided with a spring loaded hinged cutter blade 25a mounted to swing on the pivot pin 25b to prevent damaging the dough ribbon 11 during the cutting operation. A cutter stabilizing arm 25c and an actuating air cylinder 25d are provided to reciprocate the cutter through a predetermined path at the desired time intervals. The conveyor ramp 20 is traveling at a greater speed than the supply conveyor 10 when the ramp 20 is in a downwardly inclined position so that the pieces 11a cut from the dough ribbon 11 will be spaced apart as they travel down the ramp 20. These individual dough pieces 11a are then delivered to the cut product carrier which is illustrated in FIGS. 1a and 1b in the form of a continuous liner strip 18 being carried by the vacuum conveyor belt 15a in underlying relation to the discharge end of the ramp 20. The vacuum belt 15a and the ramp conveyor 20 are traveling at the same speed. The continuous liner strip 18 can be of any suitable conventional material such as treated parchment paper or the like. The perforated vacuum conveyor belt 15 carries the liner strip 18 with the cut dough pieces 11a thereon to a strip-cut-off blade 30 mounted on stabilizing arms 30a and reciprocated by air cylinder 30b timed to cut the liner strip between the spaced apart dough pieces. A pair of spaced blade stabilizing rollers 30c are provided and the blade 30 passes between the rollers during its downward cutting stroke. The blade 30 has a variable length saw-tooth cutting edge which is designed to shear off the paper without tearing the same. The cut-off sections of the liner 18 are designated by the reference character 18a and are carried down a second ramp 40 which may incorporate a perforated belt and vacuum bed in order to hold the cut-off liner sections 18a in the desired position during their downward travel to the discharge end of the conveyor 40. The speed of the conveyor 40 is greater than the speed of the conveyor 15b in order to separate the individual liner sections 18a from each other and place the same on the transport frames 45 being conveyed on the carrier frame conveyor 50 disposed below the delivery ramp 40. The speeds of the delivery ramp conveyor 40 and the frame conveyor 50 are the same. The transport frames 45 (sometimes referred to as pans) are supplied to the bottom of the ramp 40 by the carrier frame conveyor 50 as stated and are held in "ready" position by a retaining hook mechanism 55, best shown in FIG. 1a. The hook 55 is designed to engage the trailing upstanding cross-rail 45a of the leading transport frame 45 disposed in "ready" position on the conveyor 50 with the other frames 45 backed up behind this leading frame unit. The conveyor 50 is designed to permit slippage between the bottom of the transport frames and the top surface of the belt of the conveyor when the hook 55 is in its down retaining position. As the cut liner section travels down the inclined ramp 40, the "ready" transport frame 45 is released by actuating a pneumatic cylinder 55a to momentarily raise hook 55. As stated, the speed of the conveyor ramp 40 and conveyor 50 are synchronized so that the sections 18a of the liner with dough thereon will be delivered smoothly to the leading transport frame 45 released by the stop 55.

As best shown in FIG. 2 certain dough products will be better handled in aluminum foil trays having raised peripheral flanges instead of the continuous parchment liner strip 18. These trays are designated by the numeral 60 and are carried on the perforated vacuum belt section 15a. The foil trays 60 have raised flanges 60a at the edges to provide a stop engaging portion. A stop hook 61 somewhat similar to the carrier frame retaining hook 55 is provided to engage the raised trailing edge of the "ready" foil tray 60 and hold the tray 60 in "ready" position on the conveyor belt 15a. An air cylinder 61a is provided for momentarily raising the hook 61 in timed relation to the flow down ramp 20 of dough pieces 12a cut from dough strip 12. While the vacuum in the chamber 16 is sufficient to hold the aluminum foil trays 60 in the desired spaced apart relation synchronized to receive the cut dough pieces 12a cut from strip 12 delivered from this ramp 20, the vacuum is designed to permit slippaged between the trays 60 as they are held in abutted "ready" position by the hook 55 on the vacuum conveyor 15. The forwardly directed air flow from the pressurized supply conveyor 17 feed the trays 60 to the vacuum conveyor 16. After the dough pieces 12a are deposited onto the aluminum foil trays 60 from the conveyor 20 the filled trays are then carried to the vacuum ramp 40 and delivered into the transport frames 45 in the same manner as the individual liner pieces 18a previously described. Two or three tray lengths may be carried by each frame 45, depending upon the length of the trays. The liner cut off cutter 30 will of course be inoperative when the aluminum foil trays 60 are being used to provide the cut product carrier function.

A re-orienting cutter and conveyor assembly is provided in elevated position above the vacuum conveyor 15 as best shown in FIG. 1b. The assembly includes a conveyor 70 and a cutter 75. This cutter and conveyor assembly is designed to rotate the dough pieces 13a cut off from dough strip 13 through a 90 degree angle and to re-orient the same on the liner material 18 or in the trays 60 at the choice of the operator. With the adjustable ramp 20 in raised position the continuous ribbon of dough 13 is carried from the product supply conveyor 10 directly to the leading end of the conveyor 70. In most instances where the dough is to be reoriented during the cutting operation the thickness of the dough ribbon 13 is substantially greater than the thickness of the ribbon 11 as previously illustrated. This thicker dough ribbon 13 follows the conveyor belt 70 around the delivery end thereof into the desired substantially vertical inclined position as illustrated, where the cutter 75 is actuated to cut off the continuous strip 12 into individual pieces designated by the numeral 12a. With the ramp 20 in raised position all of the conveyors 10, 20 and 70 are adjusted to travel at the same rate of speed and the vacuum conveyor 15 will be traveling at an increased rate of speed in order to space the individual pieces of dough 13a apart on the liner or in the trays into which they are delivered.

It will be seen that this invention provides an extremely versatile multi-purpose conveyor system for converting into individual cut pieces, continuous ribbons of dough produced upstream from the conveyor system embodying this invention and delivering the cut pieces to a cut product carrier thereafter delivering each filled product carrier to transport frames for subsequent processing such as proofing and baking. The vacuum conveyor 15 is specifically designed to facilitate control of the speed and position of the carrier elements, both the continuous liner 18 and the foil trays 60 as previously described. The speed of the individual conveyors 10, 15, 20, 40, 50 and 70 are controlled by potentiometers combined with tachometers with a digital readout dial to permit the operator to accurately synchronize the various conveyors of the conveyor system. These controls are of conventional design and are shown in a block diagram illustrated in FIG. 5 of the drawings and the potentiometers and the respective readout displays can obviously be mounted on a single control panel (not shown) for ease of control by an operator. A by-pass line 76 on FIG. 5 has been used to indicate the selective use of conveyor 70 and cutter 75.

What is claimed is:

1. A multi-purpose cutter and conveyor system comprising:
   a first conveyor means for supplying continuous strip dough product material, said first conveyor means including a first discharge end,
   a first product cutter for periodically cutting the continuous product into individual pieces,
   a second conveyor means disposed below the first conveyor means to receive the cut-off portions from said first conveyor means, said second conveyor means including a second discharge end, said second conveyor means having perforations therein and means for providing a vacuum through said perforations,
   carrier means including a continuous strip of liner material delivered to said vacuum conveyor and retained thereon by the vacuum supplied through said perforations, said carrier means being positioned on and transferred by said second conveyor means and held in position thereon by the vacuum supplied through said perforations to receive the cut product pieces thereon as they are delivered from the first conveyor means,
   cutter means for severing the continuous liner strip into predetermined lengths while the strip is held in position on the vacuum conveyor,
   a third conveyor means positioned above said second conveyor means and adjacent said first discharge end to selectively receive product being supplied by said first conveyor means, said third conveyor means having a third feed end,
   means for adjusting the first discharge end of said first conveyor means from the first position to a second position, the first position delivering product directly to the liner material on said second conveyor means and the second position being elevated above the first position whereby said first discharge end and said third feed end are adjacent one another whereby product can be fed from the first conveyor means to said third conveyor means,
   said third conveyor means including a third discharge end having a sharply downwardly inclined discharge section to transfer the dough strip into a downwardly oriented position for cutting, and
   a second product cutter actuated periodically to cut off downwardly oriented dough pieces and deliver the same in re-oriented position with their cut sides down onto the liner material being carried by the vacuum conveyor.

* * * * *